Aug. 15, 1950     O. JACOBSEN     2,518,790
PLUG VALVE
Filed Jan. 5, 1945     2 Sheets-Sheet 2
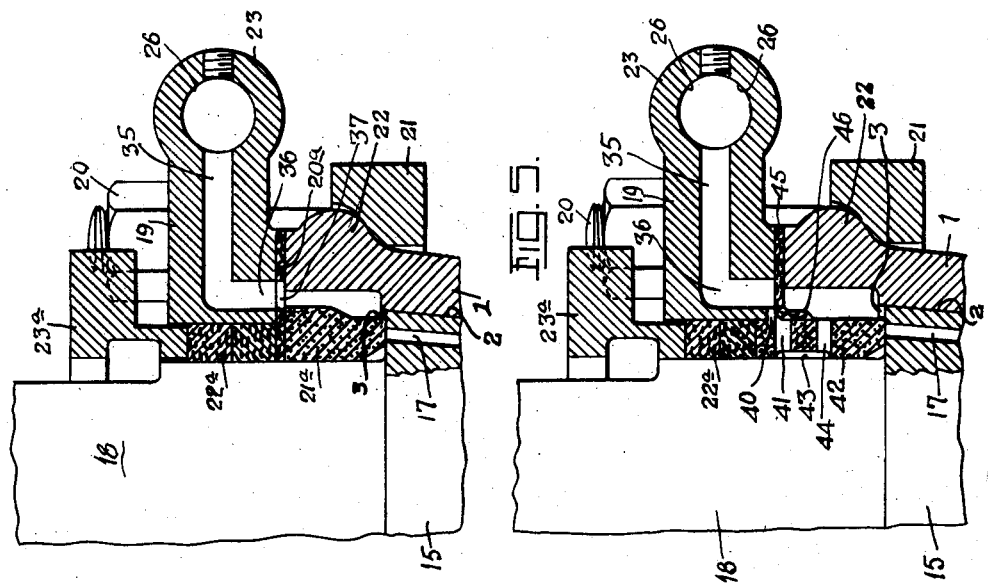
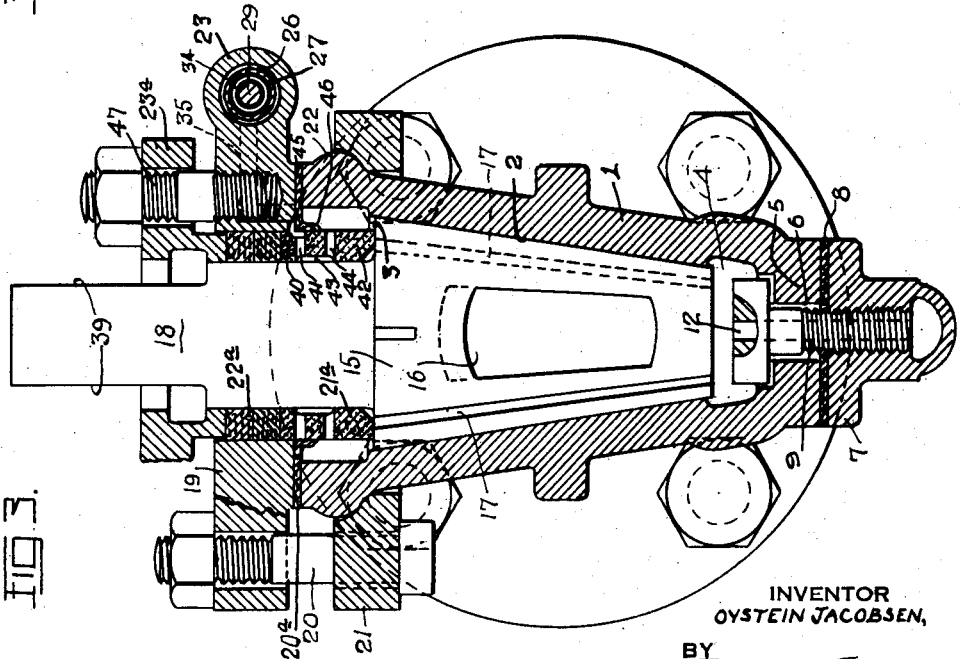
INVENTOR
OYSTEIN JACOBSEN,
BY
*Toulmin & Toulmin*
ATTORNEYS Patented Aug. 15, 1950

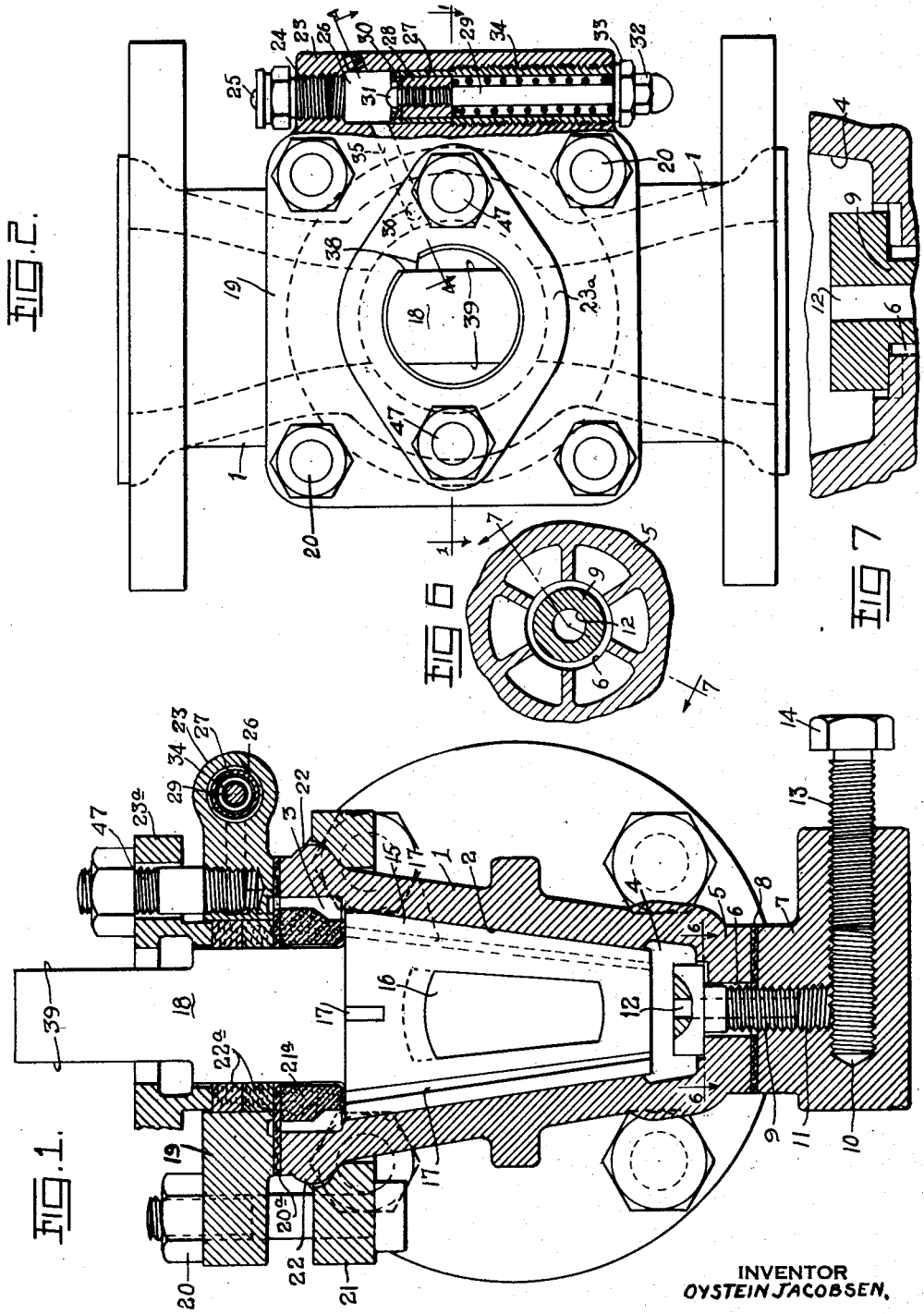

2,518,790

UNITED STATES PATENT OFFICE 2,518,790

PLUG VALVE

Oystein Jacobsen, Montgomery County, Ohio, assignor to The Duriron Company, Inc., Dayton, Ohio, a corporation of New York Application January 5, 1945, Serial No. 571,392

2 Claims. (Cl. 251—93)

This invention relates to plug valves and, particularly, to lubricated valves of this type.

The particular object of this invention is to provide a lubricated plug valve in which the source of lubricant is wholly independent of the plug and valve stem and valve casing proper. However, while the source of lubricant is located remotely from the plug and casing, it is still in a convenient position for charging and discharging the grease or while it is being used as a lubricant.

Plug valves are often made of a material such as silicon iron which is difficult to machine. Such valves are used in connection with corrosive fluids and gases. By means of this invention it is possible adequately to lubricate such a valve without difficult and expensive machining of the valve body or plug.

Lubricant is often introduced into plug valves through the stem which is attached to the plug. This requires that the stems be hollow and, therefore, weakened and subject to breakage. Also, the stem is often in an inconvenient place to insert the lubricant, which may be either a stiff grease in the form of a stick or a liquid or semi-liquid grease or oil.

This invention provides means whereby it is possible to lubricate a plug type valve without boring or hollowing out the stem so that not only is the stem stronger, but also the lubricant is introduced into the valve nearer to its point of application.

Thus it is another object of this invention to provide a separate reservoir carried by the cap plate of a plug valve which is so disposed in a horizontal position as to be readily accessible for the introduction of lubricants and the discharge thereof. By so locating the reservoir in the cap plate a relatively short passageway suffices to conduct the lubricant to a point adjacent the periphery of the plug. In this manner tortuous passageways are eliminated and the lubricant is discharged directly through a relatively short passageway to the surface of the valve.

It is another object to provide a lubricated plug valve having the foregoing advantages and in which the stem itself receives lubricant from the said reservoir so that the manipulation of the valve is facilitated.

It is another object to provide a lubricated plug valve in which the lubricant is continuously under pressure but in which there is a sealing arrangement which prevents loss of lubricant from the valve.

It is another object of this invention to provide a lubricated plug valve having a clean out port at the bottom of the valve and for the lubricant introduced at the top of the valve so that the valve casing may be flushed out when necessary.

These and other objects and advantages will become more apparent upon reference to the attached drawings, in which:

Figure 1 is a vertical section through a plug valve having this invention and is indicated by the line 1—1 on Figure 2 and also by the line 1—1 in Figure 2;

Figure 2 is a top plan view of the valve of Figure 1 showing in section the lubricant pressure chamber;

Figure 3 is a vertical section through the valve similar to Figure 1 but showing a modified form of lubricating passageway and clean out plug;

Figure 4 is a section on the line 4—4 of Figure 2 showing in more detail the passageway from the lubricating chamber to the valve plug; and Figure 5 is a view similar to Figure 4 showing the lubricating passageway in Figure 3.

Figure 6 is a cross-sectional view of enlarged size of the lower portion of the valve body taken along line 6—6 in Figure 1.

Figure 7 is a fragmentary longitudinal sectional view, greatly enlarged, showing the structure forming the lower part of the valve casing. This figure is taken along the section line 7—7 in Figure 6.

Referring to the drawings more in detail, the body of the valve is indicated at 1 and comprises a conical bore 2 which is open at its upper end as at 3. The lower end of the body 1 is provided with an enlarged chamber 4, the bottom of which is provided with a boss 5 having a bore 6 therethrough. Mounted in the passageway 6 is a screw plug 9, the head of which rests on ribs formed in a recess in the lower surface of the chamber 4.

A block 7 is threaded to receive the plug 9 and a sealing washer 8 is placed between the block 7 and the boss 5 of the valve body 1. The block 7 is also provided with a threaded bore 10 which intersects the threaded passage 11 which receives the screw 9.

A screw 13 having a head 14 is adapted to be inserted into the threaded bore 10 of the block 7. The screw 9 has a central bore 12 so that communication is had between the chambers 4 and 10. It will be noted that the chamber 7 is attached to the body 1 without the said body having been machined. Thus, the body 1 may be made of silicon bearing iron or other non-corrosive metals.

In addition to providing for a passage for the flushing out of the valve, the bore 10 in the block 7 also provides a chamber for receiving stick grease which may be discharged into the chamber 4 by the threading of the screw 13.

Adapted to be received within the bore 2 is a valve plug 15 which has a transverse passage 16 therethrough for controlling the flow of liquid or gases through the valve. The block 15 is also provided with a plurality of passages 17 which receive lubricant and thus facilitate the turning of the block 15 in the bore 2.

The valve member 15 is also provided with a stem 18, the upper end of which extends upwardly from the casing 1 and through the cover plate 19. The cover plate is retained on the valve casing by the bolts 20 which pass through the said cover plate and also through a retaining ring 21 which abuts the shoulder 22 extending around the upper edge of the casing 1. A sealing ring 20a is disposed between the plate 19 and the valve casing 1 so that any leakage of lubricant therebetween is prevented. The sealing ring 20a extends inwardly and fits closely around the stem 18. An annular ring of material such as graphite or bronze lies between the sealing ring and the top of the plug 15 and is indicated at 21a.

Bearing against the sealing ring 20a from above are rings of packing 22a which are retained in position by a packing gland 23a which is retained in position by the bolts 47 which extend into the cover plate 19.

The cover plate 19 is provided with a laterally exposed tubular extension 23 which lies in a horizontal plane. This extension constitutes a lubricant pressure chamber which supplies grease or oil to the valve block. The extension 23 is open at each end and one end is closed by a fitting 24 which comprises a ball check 25 so that a conventional grease gun can be used to insert lubricant into the bore 26 of the projection 23.

Inserted into the opposite end of the bore 26 is a screw 27 which serves as a cylinder for the piston 28 which is carried on a piston rod 29. The end of the piston 28 is provided with a sealing washer 30 which is retained in position by a cap screw 31.

The outer end of the piston rod 29 is provided with a head 32 which engages with the end 33 of a force screw 27 when the piston is at the bottom of its stroke. A compression spring 34 is disposed between the end 33 and the piston 28 so that the latter is urged downwardly in the bore 26 toward the fitting 24.

The chamber 26 is connected by a laterally disposed passageway 35 and a vertically disposed passageway 36 with the open end 3 of the valve casing 1. An opening 37 in the sealing ring 20a facilitates the passage of fluid into the said open end.

The packing gland 23a is provided with internally disposed shoulders 38 for engaging the flats 39 of the stem 18 in order to limit its rotation in either direction. In this manner it can be determined whether the valve is open or closed or in any intermediate position. Also by means of the stops the passageways 17 are prevented from being positioned in alignment with either of the valve openings so that lubricant is not needlessly lost into the liquid or gas which the valve is controlling.

In operation the chamber 26 is loaded with lubricant under pressure so that the spring 34 is compressed. Thereafter, as the valve is turned in use, the lubricant is gradually forced through the passageway 35, 36, 37 and thence into the passageways 17 on the surface of the plug 15. Should it be desired to clean out the valve, the screw 13 may be removed and a quantity of lubricant forced in through the fitting 24 and thence through the grooves 17 into the chamber 4 and then through the passage 12 into the bore 10.

Lubricant may also be introduced into the valve through the passage 10 by placing a stick of grease into the passageway 10 and threading the screw 13 downwardly until the grease is forced upwardly through the valve and loads the spring 34.

Referring to the modifications shown in Figures 3 and 5 it will be observed that the lubricant passes from the bore 26 into the passages 35 and 36 and thence through the notch 40 into the bore 41 in the ring 42, which last is a member similar to the ring 21a of Figure 1. The lubricant then passes through the channel 43 and thence through the passage 44 into the open end 3 of the valve casing 1. It will be apparent that the lubricant thus tends to lubricate the stem 18 as well as the plug 15. In order to facilitate the sealing around the ring 42, the sealing member 45 has a downwardly turned inward edge as at 46 which lies adjacent the exterior surface of the said ring member.

It will be understood that I desire to comprehend within my invention such modifications as come within the scope of the claims and the invention.

I claim:

1. The combination in a plug valve, a casing having a circular opening, a plug member of circular configuration rotatably mounted within a circular opening in the casing, a closure member adapted for closing said valve casing and for retaining said plug valve in operating position, said plug valve having a stem, lubricant-receiving passages along the plug member for lubricating the contiguous surfaces between said member and the valve casing, a ring surrounding the stem and resting on the upper surface of the plug member and within the valve casing, said ring having a smaller diameter than the circular opening in the valve casing above the plug to leave an annular space between the ring and the interior of the casing, said closure member having a chamber containing lubricant under pressure, said chamber having a passageway formed in the closure member and communicating with said annular space at the upper surface of the plug member in order to apply lubricant under pressure to the lubricating passages along the plug member.

2. The combination in a plug valve, a casing having a circular opening, a plug member of circular configuration rotatably mounted within said casing, a closure member adapted for closing the casing, said plug member having lubricant-receiving passages for lubricating the contiguous surfaces of the plug member and the valve casing, said plug having a stem, packing about the stem, a ring positioned between the packing and the plug member, said ring surrounding the stem and having a smaller diameter than the opening in the casing above the plug member to leave an annular space between the ring and the interior of the casing, said closure member having a chamber containing lubricant under pressure, a passageway formed in the closure member and extending from said chamber as far as the packing material and also communicating with said annular space at the upper surface of the plug member in order to apply lubricant under pressure to each of the packing and to the lubricating passages along the plug member.

OYSTEIN JACOBSEN.

REFERENCES CITED

The following references are of record in the file of this patent:

UNITED STATES PATENTS

| Number | Name | Date |
|---|---|---|
| 144,735 | Brooks | Nov. 18, 1873 |
| 1,784,573 | Butler | Dec. 9, 1930 |
| 2,038,885 | Clade | Apr. 28, 1936 |
| 2,048,384 | Jacobsen | July 21, 1936 |
| 2,168,903 | Jacobsen | Aug. 8, 1939 |
| 2,171,590 | Milliken | Sept 5, 1939 |
| 2,269,886 | Volpin | Jan. 13, 1942 |
| 2,281,697 | Kerr | May 5, 1942 |

FOREIGN PATENTS

| Number | Country | Date |
|---|---|---|
| 94,600 | Sweden | of 1938 |
| 256,098 | Great Britain | of 1926 |
| 499,703 | Great Britain | of 1938 |